United States Patent
Yoon

(10) Patent No.: US 11,621,589 B1
(45) Date of Patent: Apr. 4, 2023

(54) MITIGATING SENSOR INTERFERENCE IN WIRELESS POWER TRANSFER SYSTEM

(71) Applicant: NuCurrent, Inc., Chicago, IL (US)

(72) Inventor: Andy Yoon, Chicago, IL (US)

(73) Assignee: NuCurrent, Inc., Chicago, IL (US)

( * ) Notice: Subject to any disclaimer, the term of this patent is extended or adjusted under 35 U.S.C. 154(b) by 0 days.

(21) Appl. No.: 17/496,338

(22) Filed: Oct. 7, 2021

(51) Int. Cl.
*H02J 50/10* (2016.01)
*H02J 50/80* (2016.01)
*H01F 27/36* (2006.01)
*G06F 3/0354* (2013.01)
*H02J 50/20* (2016.01)
*G06F 1/26* (2006.01)

(52) U.S. Cl.
CPC ............. *H02J 50/20* (2016.02); *G06F 1/266* (2013.01); *G06F 3/03543* (2013.01); *H01F 27/36* (2013.01); *H02J 50/10* (2016.02); *H02J 50/80* (2016.02)

(58) Field of Classification Search
CPC ........ G06F 1/266; G06F 3/033; G06F 3/0354; G06F 3/03541; G06F 3/03543; H01F 27/36; H01F 27/363; H01F 27/366; H02J 7/00032; H02J 7/00034; H02J 50/005; H02J 50/10; H02J 50/12; H02J 50/80
See application file for complete search history.

(56) References Cited

U.S. PATENT DOCUMENTS

| | | | |
|---|---|---|---|
| 10,072,947 B1 * | 9/2018 | Mantier | ................. H02J 7/0042 |
| 2003/0048254 A1 * | 3/2003 | Huang | .................... G06F 3/039 345/158 |
| 2013/0005251 A1 * | 1/2013 | Soar | ........................ H02J 50/80 307/9.1 |
| 2013/0033224 A1 * | 2/2013 | Raedy | ..................... B60L 53/12 324/207.17 |
| 2015/0115723 A1 * | 4/2015 | Levo | ....................... H01F 27/36 307/104 |
| 2017/0364165 A1 | 12/2017 | Chang | |
| 2018/0351389 A1 | 12/2018 | Morier et al. | |
| 2019/0074724 A1 * | 3/2019 | Wittenberg | .......... H04B 5/0037 |
| 2019/0244752 A1 | 8/2019 | Park et al. | |
| 2021/0304679 A1 | 9/2021 | Kim et al. | |
| 2022/0042643 A1 * | 2/2022 | Rasmussen | ............ F16M 13/08 |

FOREIGN PATENT DOCUMENTS

WO 2021163423 A1 8/2021

OTHER PUBLICATIONS

International Searching Authority, PCT International Search Report and Written Opinion, PCT International Application No. PCT/US2022/046108 dated Feb. 3, 2023, 9 pages.

* cited by examiner

*Primary Examiner* — Levi Gannon
(74) *Attorney, Agent, or Firm* — Lee Sullivan Shea & Smith LLP

(57) ABSTRACT

A wireless power transfer system is provided for a peripheral device, including a wireless receiver system in the peripheral device, the wireless receiver system having a receiver antenna configured to receive the wireless power signals and wireless data signals via inductive coupling with the transmission antenna. The receiver antenna includes a first central opening and a shield adjacent the receiver antenna, the shield having therein a second central opening, with a sensor located within both the first and second central openings, the sensor being configured to sense a position of the peripheral device.

20 Claims, 8 Drawing Sheets

MITIGATING SENSOR INTERFERENCE IN WIRELESS POWER TRANSFER SYSTEM

TECHNICAL FIELD

The present disclosure generally relates to systems and methods for wireless transfer of electrical power and/or electrical data signals, and, more particularly, to a wireless power transfer system wherein a sensor is located radially within a receiver coil of a peripheral device.

BACKGROUND

Wireless connection systems are used in a variety of applications for the wireless transfer of electrical energy, electrical power, electromagnetic energy, electrical data signals, among other known wirelessly transmittable signals. Such systems often use inductive and/or resonant inductive wireless power transfer, which occurs when magnetic fields created by a transmitting element induce an electric field and, hence, an electric current, in a receiving element. These transmitting and receiving elements will often take the form of coiled wires and/or antennas.

Transmission of one or more of electrical energy, electrical power, electromagnetic energy and/or electronic data signals from one of such coiled antennas to another, generally, is executed at an operating frequency and/or over an operating frequency range. The operating frequency may be selected for a variety of reasons, such as, but not limited to, power transfer characteristics, power level characteristics, self-resonant frequency restraints, design requirements, adherence to standards bodies' required characteristics (e.g. electromagnetic interference (EMI) requirements, specific absorption rate (SAR) requirements, among other things), bill of materials (BOM), and/or form factor constraints, among other things. It is to be noted that, "self-resonating frequency," as known to those having skill in the art, generally refers to the resonant frequency of a passive component (e.g., an inductor) due to the parasitic characteristics of the component.

One or more endpoints of a wireless power and data transfer system may be a peripheral device needing to have a small footprint. Further, some such devices require, for their normal function, a sensor in addition to the wireless power and data transfer antenna coil used to power or charge the peripheral device. Examples of such systems include wirelessly charged peripherals such as pointers, mice, sensors, among other devices.

SUMMARY

In some applications for wireless power transfer, it is desired to minimize the footprint of the powered device while maintaining normal device function and wireless charging capability. In a device requiring a downward-facing sensor, such as a mouse, it is possible to locate the sensor in the center of the receiver coil, substantially in-plane therewith. However, this will cause power transfer inefficiencies given the shielding removed from that central region to accommodate the sensor. To this end, in an aspect of the disclosure, a coil and shield configuration is provided that minimizes the loss of efficiency so as to maintain charging ability and also allow the sensor to fully function.

In an aspect of the disclosure, a wireless power transfer system is provided for a peripheral device. In this aspect, the system includes a wireless receiver system in the peripheral device. The wireless receiver system in turn has a receiver antenna configured to receive the wireless power signals and wireless data signals via inductive coupling with the transmission antenna, a shield adjacent the receiver antenna and a sensor. In one aspect, the receiver antenna has a first central opening and the shield has a second central opening. The sensor is located centrally to both the first and second central openings, and is configured to sense a position of the peripheral device. The sensor may be an optical sensor.

The first central opening and the second central opening may be of substantially the same size, but alternatively may be of different sizes. The shield may comprise a ferrite material, and may comprise one or more of a polymer, sintered flexible ferrite sheet, rigid shield, and a hybrid shield, having a rigid portion and a flexible portion. In an aspect, the ferrite material includes one or more of manganese-zinc, nickel-zinc, copper-zinc, magnesium-zinc, and combinations thereof.

In another aspect of the disclosure, a peripheral device includes a wireless receiver system having a receiver antenna configured to receive wireless power signals and wireless data signals from a wireless transmitter system via inductive coupling. The receiver antenna may be a substantially flat coil having a first central opening. A shield adjacent the receiver antenna has therein a second central opening. A sensor located centrally to both the first and second central openings is configured to sense a position of the peripheral device. In accordance with one possible feature, the sensor is an optical sensor.

In accordance with other possible features, the first and second central openings are of substantially the same size, although they may optionally be of different sizes.

In accordance with a possible feature, the shield includes a ferrite material, which may further include one or more of a polymer, sintered flexible ferrite sheet, rigid shield, a hybrid shield, having a rigid portion and a flexible portion. The ferrite material may further include one or more of manganese-zinc, nickel-zinc, copper-zinc, magnesium-zinc, and combinations thereof.

In another aspect of the disclosure, a wireless power transfer system is provided having a horizontal surface with a horizontal transmitter antenna therein configured for sending wireless power signals and wireless data signals. An associated peripheral device includes a receiver antenna configured to receive the wireless power signals and wireless data signals via inductive coupling with the transmission antenna. In this aspect, the receiver antenna is formed as a substantially flat coil parallel to the transmitter antenna during use and having a first central opening. A shield adjacent the receiver antenna includes a second central opening. A sensor located within both the first and second central openings is configured to sense a position of the peripheral device on the horizontal surface.

In a possible feature, the sensor is an optical sensor. Moreover, the first and second central opening may be of substantially the same size or of different sizes. The shield comprises a ferrite material, which may include one or more of a polymer, sintered flexible ferrite sheet, rigid shield, a hybrid shield, having a rigid portion and a flexible portion.

These and other aspects and features of the present disclosure will be better understood when read in conjunction with the accompanying drawings.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto. Additional, different, or fewer components and methods may be included in the systems and methods.

DETAILED DESCRIPTION

In the following description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1:
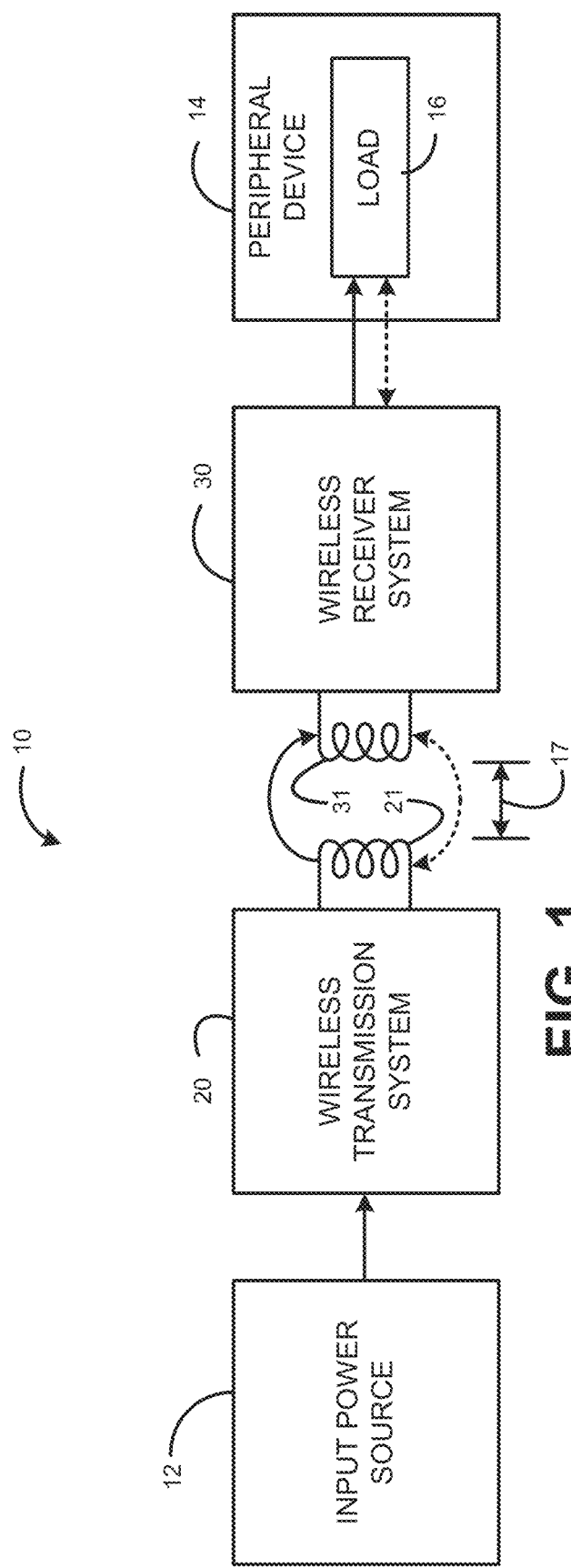
FIG. 1 is a block diagram of an embodiment of a system for wirelessly transferring one or more of electrical energy, electrical power signals, electrical power, electromagnetic energy, electronic data, and combinations thereof, in accordance with the present disclosure.

Referring now to the drawings and with specific reference to FIG. 1, a wireless power transfer system 10 is illustrated. The wireless power transfer system 10 provides for the wireless transmission of electrical signals, such as, but not limited to, electrical energy, electrical power, electrical power signals, electromagnetic energy, and electronically transmittable data ("electronic data"). As used herein, the term "electrical power signal" refers to an electrical signal transmitted specifically to provide meaningful electrical energy for charging and/or directly powering a load, whereas the term "electronic data signal" refers to an electrical signal that is utilized to convey data across a medium.

The wireless power transfer system 10 provides for wireless transmission of electrical signals via near field magnetic coupling. As shown in the embodiment of FIG. 1, the wireless power transfer system 10 includes one or more wireless transmission systems 20 and one or more wireless receiver systems 30. A wireless receiver system 30 is configured to receive electrical signals from, at least, a wireless transmission system 20.

As illustrated, the wireless transmission system 20 and wireless receiver system 30 may be configured to transmit electrical signals across, at least, a separation distance or gap 17. A separation distance or gap, such as the gap 17, in the context of a wireless power transfer system, such as the system 10, does not include a physical connection, such as a wired connection. There may be intermediary objects located in a separation distance or gap, such as, but not limited to, air, a counter top, a casing for an electronic device, a plastic filament, an insulator, a mechanical wall, among other things; however, there is no physical, electrical connection at such a separation distance or gap.

Thus, the combination of a wireless transmission system 20 and wireless receiver system 30 creates an electrical connection without the need for a physical connection. As used herein, the term "electrical connection" refers to any facilitation of a transfer of an electrical current, voltage, and/or power from a first location, device, component, and/or source to a second location, device, component, and/or destination. An "electrical connection" may be a physical connection, such as, but not limited to, a wire, a trace, a via, among other physical electrical connections, connecting a first location, device, component, and/or source to a second location, device, component, and/or destination. Additionally or alternatively, an "electrical connection" may be a wireless power and/or data transfer, such as, but not limited to, magnetic, electromagnetic, resonant, and/or inductive field, among other wireless power and/or data transfers, connecting a first location, device, component, and/or source to a second location, device, component, and/or destination.

While FIG. 1 may depict wireless power signals and wireless data signals transferring only from one antenna (e.g., transmission antenna 21) to another antenna (e.g., receiver antenna 31), it is certainly possible that a transmitting antenna 21 may transfer electrical signals and/or couple with one or more other antennas.

In some cases, the gap 17 may also be referenced as a "Z-Distance," because, if one considers each of antenna 21 and antenna 31 to be disposed substantially along respective common X-Y planes, then the distance separating the antennas 21, 31 is the gap in a "Z" or "depth" direction. However, flexible and/or non-planar coils are certainly contemplated by embodiments of the present disclosure and, thus, it is contemplated that the gap 17 may not be uniform, across an envelope of connection distances between the antennas 21, 31. It is contemplated that various tunings, configurations, and/or other parameters may alter the possible maximum distance of the gap 17, such that electrical transmission from the wireless transmission system 20 to the wireless receiver system 30 remains possible.

The wireless power transfer system 10 operates when the wireless transmission system 20 and the wireless receiver system 30 are coupled. As used herein, the terms "couples," "coupled," and "coupling" generally refer to magnetic field coupling, which occurs when a transmitter and/or any components thereof and a receiver and/or any components thereof are coupled to each other through a magnetic field. Such coupling may include coupling, represented by a coupling coefficient (k); that is at least sufficient for an induced electrical power signal, from a transmitter, to be harnessed by a receiver. Coupling of the wireless transmission system 20 and the wireless receiver system 30, in the system 10, may be represented by a resonant coupling coefficient of the system 10 and, for the purposes of wireless power transfer, the coupling coefficient for the system 10 may be in the range of between about 0.01 and 0.9. The coupling coefficient may change with changes in either the Z-Distance or the vertical registration of the antennae 21, 31.

As illustrated in FIG. 1, at least the wireless transmission system 20 is associated with an input power source 12. The input power source 12 may be operatively associated with a host device such as a desktop or laptop computer or other electrically operated device, circuit board, electronic assembly, dedicated charging device, or any other contemplated electronic device. Example host devices, with which the wireless transmission system 20 may be associated include, but are not limited to including, a device that includes an integrated circuit, a portable computing device, storage medium for electronic devices, charging apparatus for one or multiple electronic devices, dedicated electrical charging devices, among other contemplated electronic devices.

The input power source 12 may be or may include one or more electrical storage devices, such as an electrochemical cell, a battery pack, and/or a capacitor, among other storage devices. Additionally or alternatively, the input power source 12 may be any electrical input source (e.g., any alternating current (AC) or direct current (DC) delivery port) and may include connection apparatus from said electrical input source to the wireless transmission system 20 (e.g., transformers, regulators, conductive conduits, traces, wires, or equipment, goods, computer, camera, mobile phone, and/or other electrical device connection ports and/or adaptors, such as but not limited to USB ports and/or adaptors, among other contemplated electrical components).

Electrical energy received by the wireless transmission system 20 is used for at least two purposes: to provide electrical power to internal components of the wireless transmission system 20 and to provide electrical power to the transmission antenna 21. The transmission antenna 21 is configured to wirelessly transmit the electrical signals conditioned and modified for wireless transmission by the wireless transmission system 20 via near-field magnetic coupling (NFMC). Near-field magnetic coupling enables the transfer of signals wirelessly through magnetic induction between the transmission antenna 21 and the receiving antenna 31 of, or associated with, the wireless receiver system 30. Near-field magnetic coupling may be and/or be referred to as "inductive coupling," which, as used herein, is a wireless power transmission technique that utilizes an alternating electromagnetic field to transfer electrical energy between two antennas. Such inductive coupling is the near field wireless transmission of magnetic energy between two magnetically coupled coils that are tuned to resonate at a similar frequency. Accordingly, such near-field magnetic coupling may enable efficient wireless power transmission via resonant transmission of confined magnetic fields. Further, such near-field magnetic coupling may provide connection via "mutual inductance," which, as defined herein is the production of an electromotive force in a circuit by a change in current in a second circuit magnetically coupled to the first.

In one or more embodiments, the inductor coils of either the transmission antenna 21 or the receiver antenna 31 are strategically positioned to facilitate reception and/or transmission of wirelessly transferred electrical signals through near field magnetic induction. As such, movement of either device from that position may require retuning of the circuit operating parameters to re-optimize coupling.

Antenna operating frequencies may comprise all operating frequency ranges, examples of which may include, but are not limited to, about 87 kHz to about 205 kHz (Qi™ interface standard). The operating frequencies of the antennas 21, 31 may be operating frequencies designated by the International Telecommunications Union (ITU) in the Industrial, Scientific, and Medical (ISM) frequency bands. Antenna operating frequencies may also comprise relatively high operating frequency ranges, examples of which may include, but are not limited to, 6.78 MHz (e.g., in accordance with the Rezence and/or Airfuel interface standard and/or any other proprietary interface standard operating at a frequency of 6.78 MHz), 13.56 MHz (e.g., in accordance with the NFC standard, defined by ISO/IEC standard 18092), 27 MHz, and/or an operating frequency of another proprietary operating mode. The operating frequencies of the antennas 21, 31 may be operating frequencies designated by the International Telecommunications Union (ITU) in the Industrial, Scientific, and Medical (ISM) frequency bands, including not limited to 6.78 MHz, 13.56 MHz, and 27 MHz, which are designated for use in wireless power transfer.

The transmitting antenna 21 and receiving antenna 31 of the present disclosure may be configured to transmit and/or receive electrical power having a magnitude that ranges from about 10 milliwatts (mW) to about 500 watts (W). In one or more embodiments the inductor coil of the transmitting antenna 21 is configured to resonate at a transmitting antenna resonant frequency or within a transmitting antenna resonant frequency band.

As known to those skilled in the art, a "resonant frequency" or "resonant frequency band" refers a frequency or frequencies wherein amplitude response of the antenna is at a relative maximum, or, additionally or alternatively, the frequency or frequency band where the capacitive reactance has a magnitude substantially similar to the magnitude of the inductive reactance. In one or more embodiments, the transmitting antenna resonant frequency is at a high frequency, as known to those in the art of wireless power transfer.

The wireless receiver system 30 may be associated with at least one peripheral device 14, wherein the peripheral device 14 may be any device providing input and/or output to a computing device, that requires electrical power for any function and/or for power storage (e.g., via a battery and/or capacitor). Additionally, the peripheral device 14 may be any peripheral device capable of receipt of electronically transmissible data. For example, the peripheral device 14 may be, but is not limited to being, a computer input device, a mouse, a keyboard, an audio device, a headset, headphones, earbuds, a recording device, a conference telephonic device, a microphone, an electronic stylus, a handheld computing device, a mobile device, an electronic tool, a game console, a robotic device, a wearable electronic device (e.g., an electronic watch, electronically modified glasses, altered-reality (AR) glasses, virtual reality (VR) glasses, among other things), a portable scanning device, a portable identifying device, a sporting good, an embedded sensor, an Internet of Things (IoT) sensor, IoT enabled clothing, IoT enabled recreational equipment, a tablet computing device, a portable control device, a remote controller for an electronic device, a gaming controller, among other things.

For the purposes of illustrating the features and characteristics of the disclosed embodiments, arrow-ended lines are utilized to illustrate transferrable and/or communicative signals and various patterns are used to illustrate electrical signals that are intended for power transmission and electrical signals that are intended for the transmission of data and/or control instructions. Except as otherwise indicated, solid lines indicate signal transmission of electrical energy over a physical and/or wireless power transfer, in the form of power signals that are, ultimately, utilized in wireless power transmission from the wireless transmission system 20 to the wireless receiver system 30. Further, except as otherwise indicated, dotted lines are utilized to illustrate electronically transmittable data signals, which ultimately may be wirelessly transmitted from the wireless transmission system 20 to the wireless receiver system 30.

While the systems and methods herein illustrate the transmission of wirelessly transmitted energy, wireless power signals, wirelessly transmitted power, wirelessly transmitted electromagnetic energy, and/or electronically transmittable data, it is certainly contemplated that the systems, methods, and apparatus disclosed herein may be utilized in the transmission of only one signal, various combinations of two signals, or more than two signals and, further, it is contemplated that the systems, method, and apparatus disclosed herein may be utilized for wireless transmission of other electrical signals in addition to or uniquely in combination with one or more of the above mentioned signals. In some examples, the signal paths of solid or dotted lines may represent a functional signal path, whereas, in practical application, the actual signal is routed through additional components en route to its indicated destination. For example, it may be indicated that a data signal routes from a communications apparatus to another communications apparatus; however, in practical application, the data signal may be routed through an amplifier, then through a transmission antenna, to a receiver antenna, where, on the receiver end, the data signal is decoded by a respective communications device of the receiver.

Figure 2:
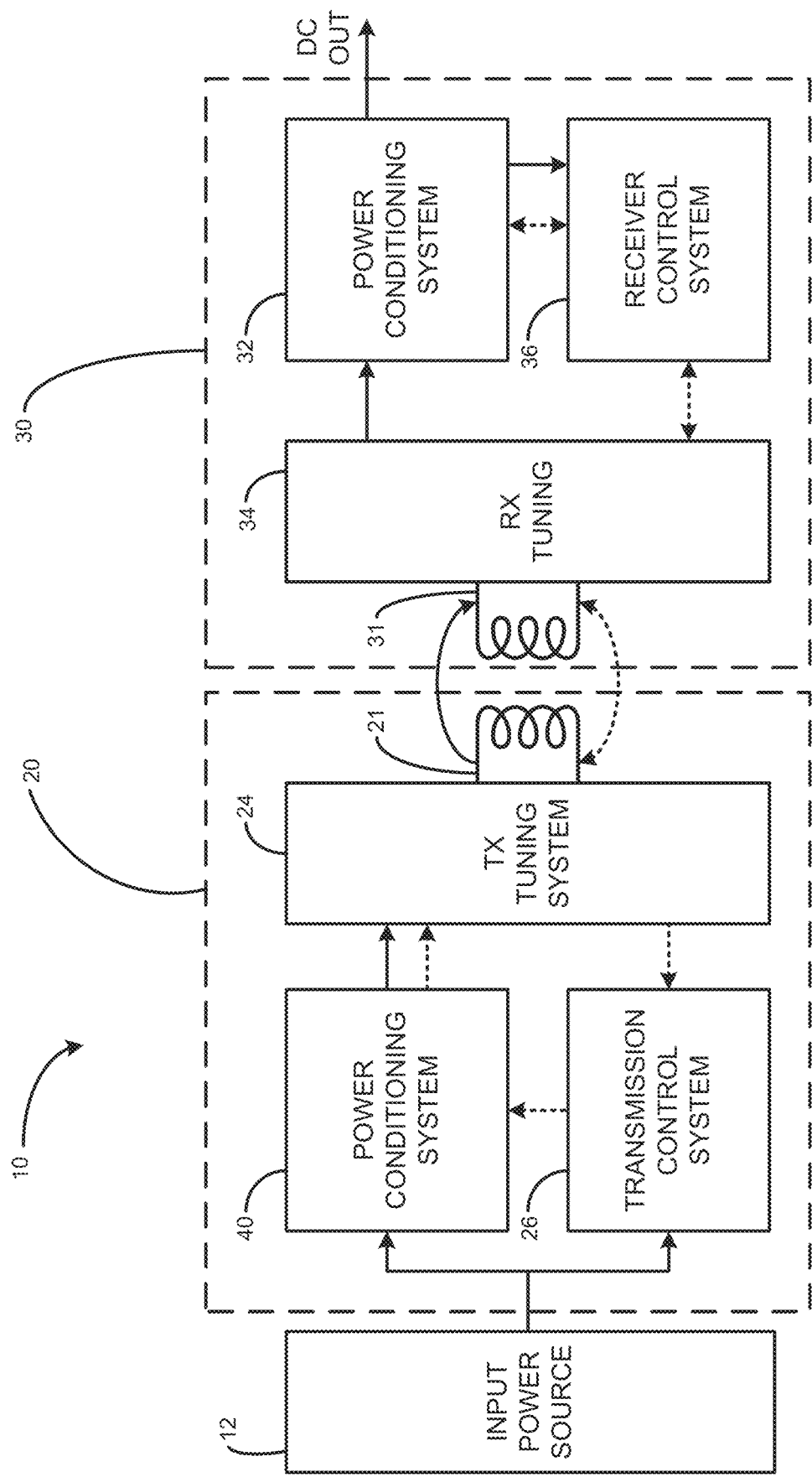
FIG. 2 is a block diagram illustrating components of the wireless transmission system and wireless receiver system of FIG. 1 in accordance with the present disclosure.

Turning now to FIG. 2, the wireless power transfer system 10 is illustrated as a block diagram including example sub-systems of both the wireless transmission systems 20 and the wireless receiver systems 30. The wireless transmission systems 20 may include, at least, a power conditioning system 40, a transmission control system 26, a transmission tuning system 24, and the transmission antenna 21. A first portion of the electrical energy input from the input power source 12 may be configured to electrically power components of the wireless transmission system 20 such as, but not limited to, the transmission control system 26. A second portion of the electrical energy input from the input power source 12 is conditioned and/or modified for wireless power transmission, to the wireless receiver system 30, via the transmission antenna 21.

Accordingly, the second portion of the input energy is modified and/or conditioned by the power conditioning system 40. While not illustrated, it is certainly contemplated that one or both of the first and second portions of the input electrical energy may be modified, conditioned, altered, and/or otherwise changed prior to receipt by the power conditioning system 40 and/or transmission control system 26, by further contemplated subsystems (e.g., a voltage regulator, a current regulator, switching systems, fault systems, safety regulators, among other things).

The wireless receiver system 30 includes, at least, the receiver antenna 31, a receiver tuning and filtering system 34, a power conditioning system 32, a receiver control system 36, and a voltage isolation circuit 70. The receiver tuning and filtering system 34 may be configured to substantially match the electrical impedance of the wireless transmission system 20. In some examples, the receiver tuning and filtering system 34 may be configured to dynamically adjust and substantially match the electrical impedance of the receiver antenna 31 to a characteristic impedance of the power generator or the load at a driving frequency of the transmission antenna 20.

Figure 3:
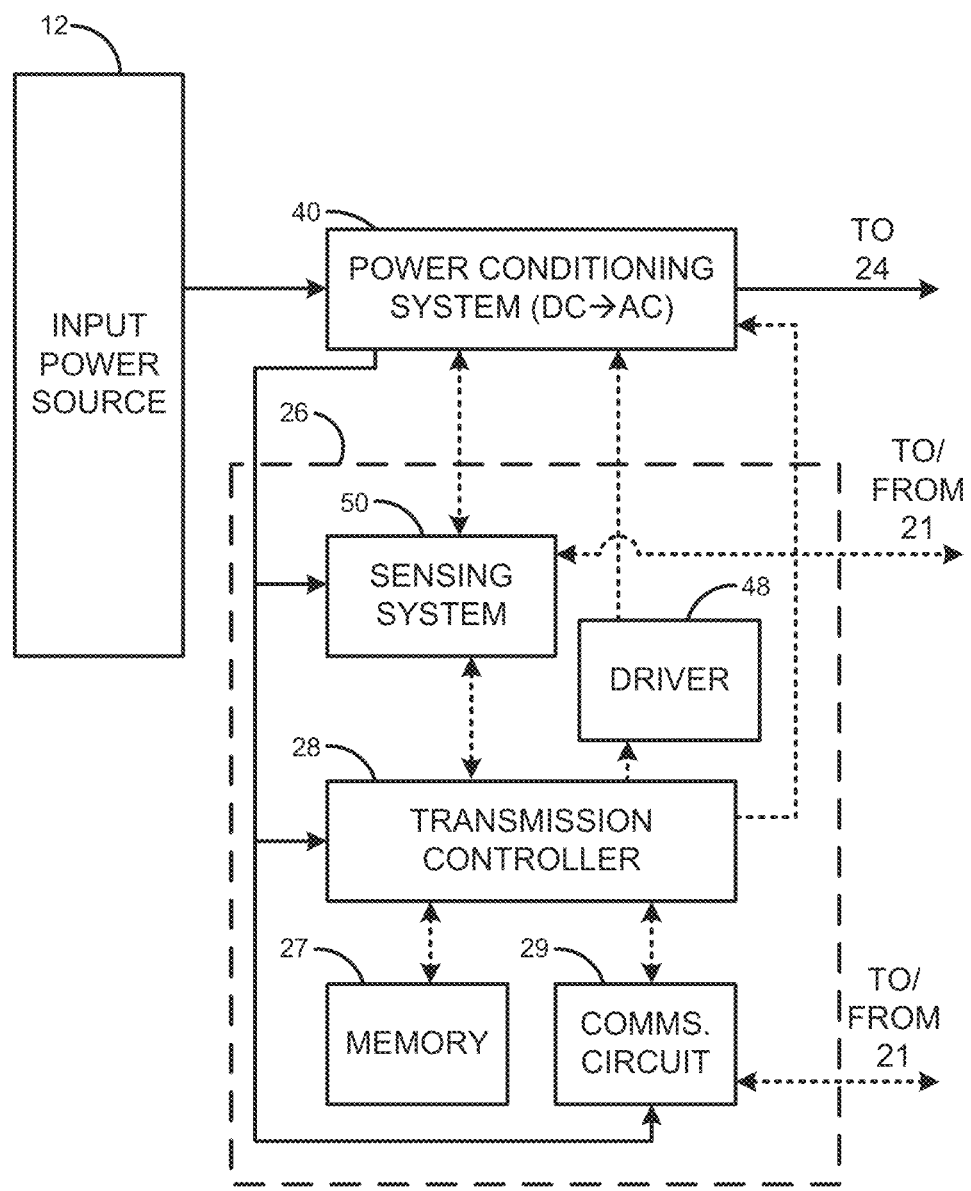
FIG. 3 is a block diagram illustrating components of a power conditioning system in accordance with the present disclosure.

Referring now to FIG. 3, with continued reference to FIGS. 1 and 2, subcomponents and/or systems of the transmission control system 26 are illustrated. The transmission control system 26 may include a sensing system 50, a transmission controller 28, a communications system 29, a driver 48, and a memory 27.

The transmission controller 28 may be any electronic controller or computing system that includes, at least, a processor which performs operations, executes control algorithms, stores data, retrieves data, gathers data, controls and/or provides communication with other components and/or subsystems associated with the wireless transmission system 20, and/or performs any other computing or controlling task desired. The transmission controller 28 may be a single controller or may include more than one controller disposed to control various functions and/or features of the wireless transmission system 20.

Functionality of the transmission controller 28 may be implemented in hardware and/or software and may rely on one or more data maps relating to the operation of the wireless transmission system 20. To that end, the transmission controller 28 may be operatively associated with the memory 27. The memory may include one or more of internal memory, external memory, and/or remote memory (e.g., a database and/or server operatively connected to the transmission controller 28 via a network, such as, but not limited to, the Internet). The internal memory and/or external memory may include, but are not limited to including, one or more of a read only memory (ROM), including programmable read-only memory (PROM), erasable programmable read-only memory (EPROM or sometimes but rarely labelled EROM), electrically erasable programmable read-only memory (EEPROM), random access memory (RAM), including dynamic RAM (DRAM), static RAM (SRAM), synchronous dynamic RAM (SDRAM), single data rate synchronous dynamic RAM (SDR SDRAM), double data rate synchronous dynamic RAM (DDR SDRAM, DDR2, DDR3, DDR4), and graphics double data rate synchronous dynamic RAM (GDDR SDRAM, GDDR2, GDDR3, GDDR4, GDDR5, a flash memory, a portable memory, and the like. Such memory media are examples of nontransitory machine readable and/or computer readable memory media.

While particular elements of the transmission control system 26 are illustrated as independent components and/or circuits (e.g., the driver 48, the memory 27, the communications system 29, the sensing system 50, among other contemplated elements) of the transmission control system 26, such components may be integrated with the transmission controller 28. In some examples, the transmission controller 28 may be an integrated circuit configured to include functional elements of one or both of the transmission controller 28 and the wireless transmission system 20, generally.

As illustrated, the transmission controller 28 is in operative association, for the purposes of data transmission, receipt, and/or communication, with, at least, the memory 27, the communications system 29, the power conditioning system 40, the driver 48, and the sensing system 50. The driver 48 may be implemented to control, at least in part, the operation of the power conditioning system 40. In some examples, the driver 48 may receive instructions from the transmission controller 28 to generate and/or output a generated pulse width modulation (PWM) signal to the power conditioning system 40. In some such examples, the PWM signal may be configured to drive the power conditioning system 40 to output electrical power as an alternating current signal, having an operating frequency defined by the PWM signal. In some examples, PWM signal may be configured to generate a duty cycle for the AC power signal output by the power conditioning system 40. In some such examples, the duty cycle may be configured to be about 50% of a given period of the AC power signal.

The sensing system 50 may include one or more sensors, wherein each sensor may be operatively associated with one or more components of the wireless transmission system 20 and configured to provide information and/or data. The term "sensor" is used in its broadest interpretation to define one or more components operatively associated with the wireless transmission system 20 that operate to sense functions, conditions, electrical characteristics, operations, and/or operating characteristics of one or more of the wireless transmission system 20, the wireless receiving system 30, the input power source 12, the host device 11, the transmission antenna 21, the receiver antenna 31, along with any other components and/or subcomponents thereof.

Figure 4:
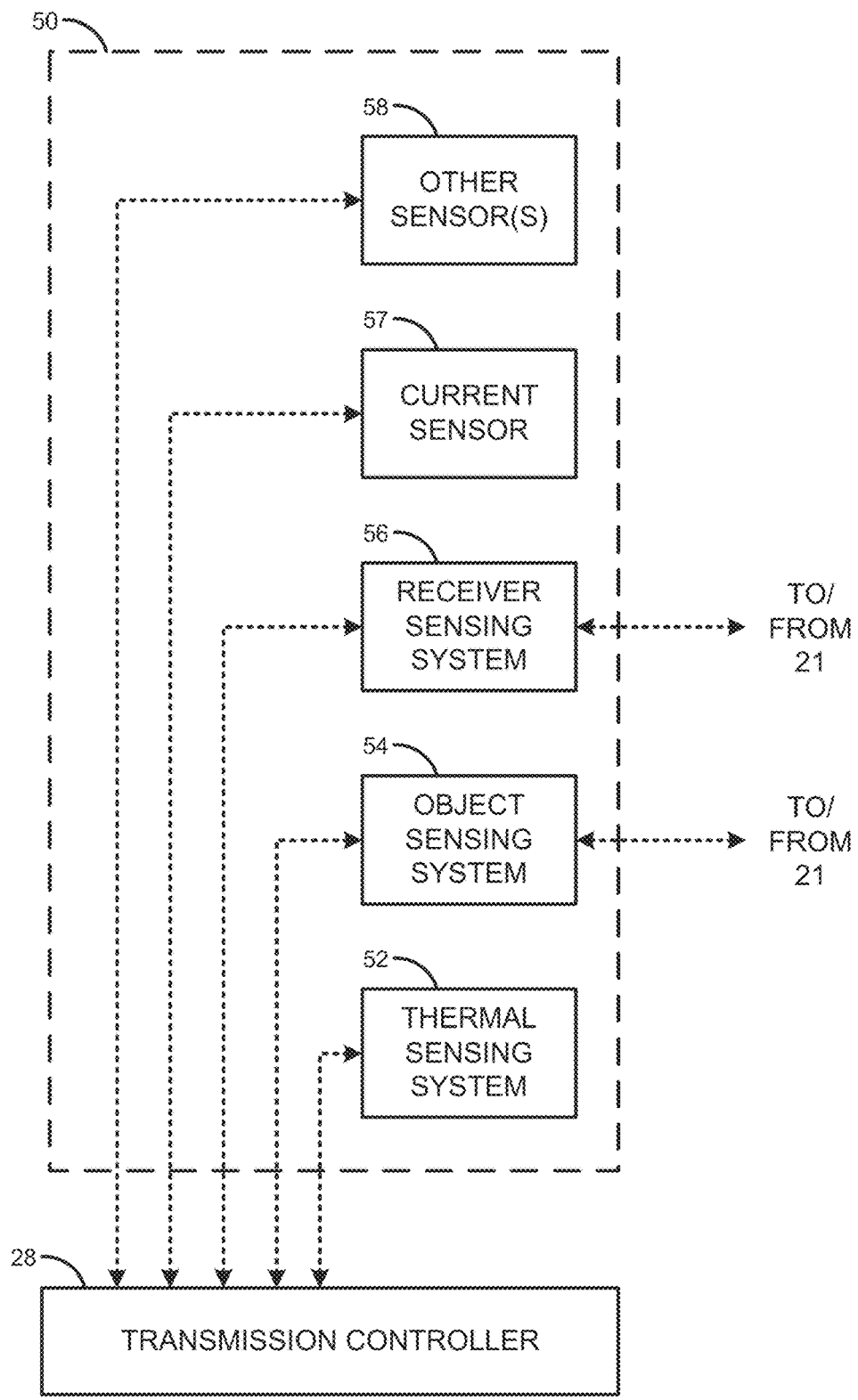
FIG. 4 is a block diagram illustrating components of a sensing system for transmission control in accordance with the present disclosure.

As illustrated in the embodiment of FIG. 4, the sensing system 50 may include, but is not limited to including, a thermal sensing system 52, an object sensing system 54, a receiver sensing system 56, a current sensor 57, and/or any other sensor 58. Within these systems, there may exist even more specific optional additional or alternative sensing systems addressing particular sensing aspects required by an application, such as, but not limited to: a condition-based maintenance sensing system, a performance optimization sensing system, a state-of-charge sensing system, a temperature management sensing system, a component heating sensing system, an IoT sensing system, an energy and/or power management sensing system, an impact detection sensing system, an electrical status sensing system, a speed detection sensing system, a device health sensing system, among others. The object sensing system 54, may be a foreign object detection (FOD) system.

Each of the thermal sensing system 52, the object sensing system 54, the receiver sensing system 56, the current sensor 57, and/or the other sensor 58, including the optional additional or alternative systems, are operatively and/or communicatively connected to the transmission controller 28. The thermal sensing system 52 is configured to monitor ambient and/or component temperatures within the wireless transmission system 20 or other elements nearby the wireless transmission system 20. The thermal sensing system 52 may be configured to detect a temperature within the wireless transmission system 20 and, if the detected temperature exceeds a threshold temperature, the transmission controller 28 prevents the wireless transmission system 20 from operating. Such a threshold temperature may be configured for safety considerations, operational considerations, efficiency considerations, and/or any combinations thereof. In a non-limiting example, if, via input from the thermal sensing system 52, the transmission controller 28 determines that the temperature within the wireless transmission system 20 has increased from an acceptable operating temperature to an undesired operating temperature (e.g., in a non-limiting example, the internal temperature increasing from about 20° Celsius (C) to about 50° C., the transmission controller 28 prevents the operation of the wireless transmission system 20 and/or reduces levels of power output from the wireless transmission system 20. In some non-limiting examples, the thermal sensing system 52 may include one or more of a thermocouple, a thermistor, a negative temperature coefficient (NTC) resistor, a resistance temperature detector (RTD), and/or any combinations thereof.

As depicted in FIG. 4, the transmission sensing system 50 may include the object sensing system 54. The object sensing system 54 may be configured to detect one or more of the wireless receiver system 30 and/or the receiver antenna 31, thus indicating to the transmission controller 28 that the receiver system 30 is proximate to the wireless transmission system 20. Additionally or alternatively, the object sensing system 54 may be configured to detect presence of unwanted objects in contact with or proximate to the wireless transmission system 20. In some examples, the object sensing system 54 is configured to detect the presence of an undesired object. In some such examples, if the transmission controller 28, via information provided by the object sensing system 54, detects the presence of an undesired object, then the transmission controller 28 prevents or otherwise modifies operation of the wireless transmission system 20. In some examples, the object sensing system 54 utilizes an impedance change detection scheme, in which the transmission controller 28 analyzes a change in electrical impedance observed by the transmission antenna 20 against a known, acceptable electrical impedance value or range of electrical impedance values.

Additionally or alternatively, the object sensing system 54 may utilize a quality factor (Q) change detection scheme, in which the transmission controller 28 analyzes a change from a known quality factor value or range of quality factor values of the object being detected, such as the receiver antenna 31. The "quality factor" or "Q" of an inductor can be defined as (frequency (Hz)×inductance (H))/resistance (ohms), where frequency is the operational frequency of the circuit, inductance is the inductance output of the inductor and resistance is the combination of the radiative and reactive resistances that are internal to the inductor. "Quality factor," as defined herein, is generally accepted as an index (figure of measure) that measures the efficiency of an apparatus like an antenna, a circuit, or a resonator. In some examples, the object sensing system 54 may include one or more of an optical sensor, an electro-optical sensor, a Hall effect sensor, a proximity sensor, and/or any combinations thereof. In some examples, the quality factor measurements, described above, may be performed when the wireless power transfer system 10 is performing in band communications.

The receiver sensing system 56 is any sensor, circuit, and/or combinations thereof configured to detect the presence of any wireless receiving system that may be couplable with the wireless transmission system 20. In some examples, the receiver sensing system 56 and the object sensing system 54 may be combined, may share components, and/or may be embodied by one or more common components. In some examples, if the presence of any such wireless receiving system is detected, wireless transmission of electrical energy, electrical power, electromagnetic energy, and/or data by the wireless transmission system 20 to said wireless receiving system is enabled. In some examples, if the presence of a wireless receiver system is not detected, continued wireless transmission of electrical energy, electrical power, electromagnetic energy, and/or data is prevented from occurring. Accordingly, the receiver sensing system 56 may include one or more sensors and/or may be operatively associated with one or more sensors that are configured to analyze electrical characteristics within an environment of or proximate to the wireless transmission system 20 and, based on the electrical characteristics, determine presence of a wireless receiver system 30.

The current sensor 57 may be any sensor configured to determine electrical information from an electrical signal, such as a voltage or a current, based on a current reading at the current sensor 57.

To better separate data signals from noise or other artifacts, accurate data transmission and sufficient power transfer efficiency still relies on sufficient coupling between the transmitting antenna and the receiving antenna. Within a peripheral device having a sensor located in the center of the WPDT receiver coil (antenna), coupling between the transmitting antenna and the receiving antenna may drop. Further, the inclusion of such sensors may degrade the quality factor or "Q" of one or both of the transmitting antenna and the receiving antenna. Such drops in Q, caused by the sensors, may adversely affect power transfer efficiency in a wireless power transfer system. However, appropriate coil design and shielding can ameliorate this drop.

Figure 5:
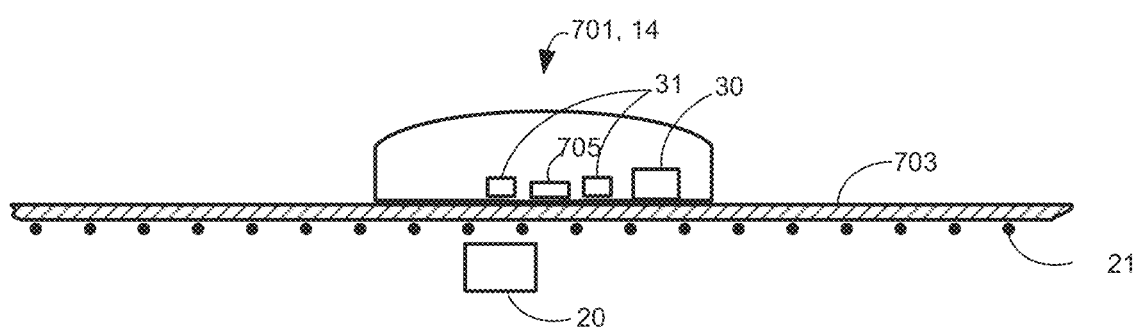
FIG. 5 is a cross-sectional side view of a peripheral device and supporting charging surface in accordance with the present disclosure showing a first relationship between the peripheral device and the supporting charging surface.

To this end, in an embodiment of the disclosed principles, the receiver coil and associated shielding are reconfigured around the central sensor. In keeping with the principles of the disclosure, FIG. 5 is a simplified cross-sectional side view of a peripheral device 701 (e.g., peripheral device 14) on a surface 703 beneath which lies a wireless power and data transmission system 20 and transmitter antenna 21. The transmitter antenna 21 may be in the form of a coil extending under a substantial portion of the usable area of the surface 703. Alternatively, the transmitter antenna 21 and/or the transmission system 20 may be incorporated underneath the surface 703, wherein the surface 703 is a surface of a commercial or consumer wireless charger, of which the transmitter antenna 21 and the transmission system 20 are incorporated therein. In some examples, such commercial or consumer wireless chargers may be or include Qi compatible and/or Qi certified wireless chargers.

The peripheral device 701 may be the peripheral device 14, within which the wireless receiver system 31 resides. The peripheral device 701 includes a wireless power and data receiver system 30 with antenna 31. In an embodiment, the peripheral device 701 also includes an optical or other movement sensor 705, which is exposed to the surface 703, to sense movement of the peripheral device 701 in the plane of the surface 703. It can be seen that the movement sensor 705 is situated in the center of the antenna 31. The coil 801 and shielding 803 of the antenna 31 can be seen in greater detail in FIG. 6.

Figure 6:
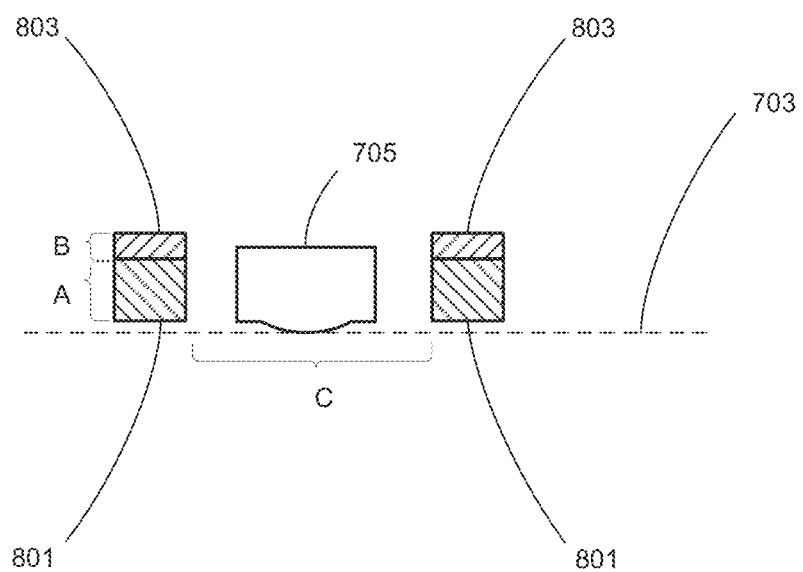
FIG. 6 is a cross-sectional detailed side view of a peripheral device showing an antenna coil and shield configuration in accordance with the present disclosure.

In particular, the antenna 31, as shown in FIG. 6, comprises a coil portion 801 and a shield portion 803, which may be a ferrite or other suitable material. Typically, in scenarios absent the sensory 705, the coil portion 801 would be thinner vertically and wider horizontally, with less space in the center. However, with the senor 705 located in the center of the coil 801, the coil may be made narrower but also thicker vertically. For example, in an example configuration, the height A+B of the coil 801 and shield 803 together is 2.6 mm, as opposed to the ordinary combined height of about 0.6 mm. Moreover, the width C of the central region is 20-23 mm as opposed to the ordinary width of 7-12 mm. In this way, the sensor 705 is able to fit centrally, for purposes of compactness or user factors, and the coil 801 is still able to couple with adequate efficiency to the transmitter antenna.

The shield 803 is a ferrite shield in an aspect of the disclosure, whose material may be selected based on the operating frequency as the complex magnetic permeability ($\mu=\mu'-j*\mu^-$) is frequency dependent. The material may be a polymer, a sintered flexible ferrite sheet, a rigid shield, or a hybrid shield, wherein the hybrid shield comprises a rigid portion and a flexible portion. Additionally, the magnetic shield may be composed of varying material compositions. Examples of materials may include, but are not limited to, zinc comprising ferrite materials such as manganese-zinc, nickel-zinc, copper-zinc, magnesium-zinc, and combinations thereof.

Figure 7:
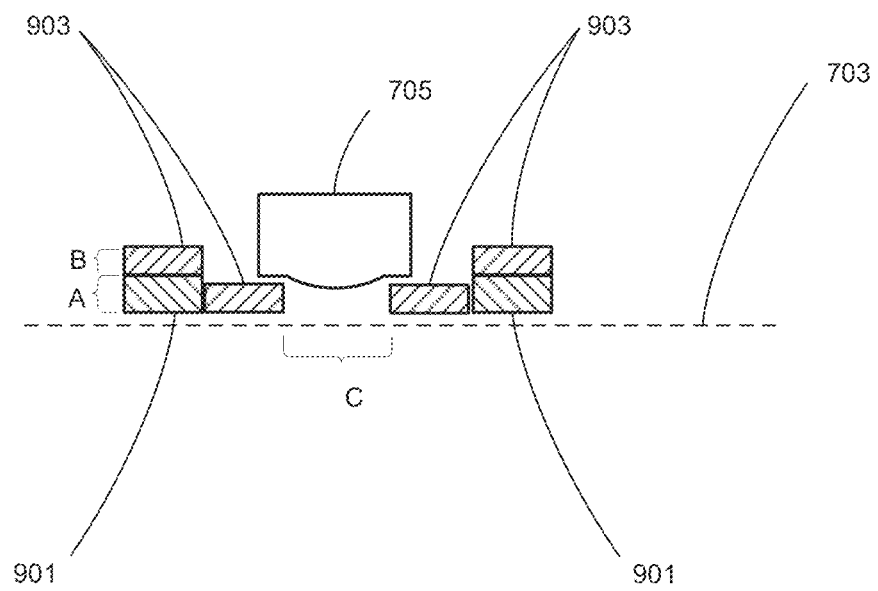
FIG. 7 is a cross-sectional detailed side view of a peripheral device showing an alternative antenna coil and shield configuration in accordance with the present disclosure.

FIG. 7 shows an alternative coil and shield configuration. In the illustrated configuration, the coil 901 has a similarly-sized central opening to that shown in FIG. 6, but is thinner. In addition, the shield 903 now rests not only atop the coil 901, but also extends into the central opening, leaving a smaller unshielded opening C. With respect to the various dimensions, the height A of the coil 901 is 0.6 mm alone in this example, and the height of the shield 903 is slightly less, for a combined overall height A+B of less than 1.2 mm. Moreover, the width C of the central region in this example is about 5-10 mm. In this configuration as well, the sensor 705 is able to fit centrally, for purposes of compactness or user factors, and the coil 901 is still able to couple with adequate efficiency to the transmitter antenna.

Figure 8:
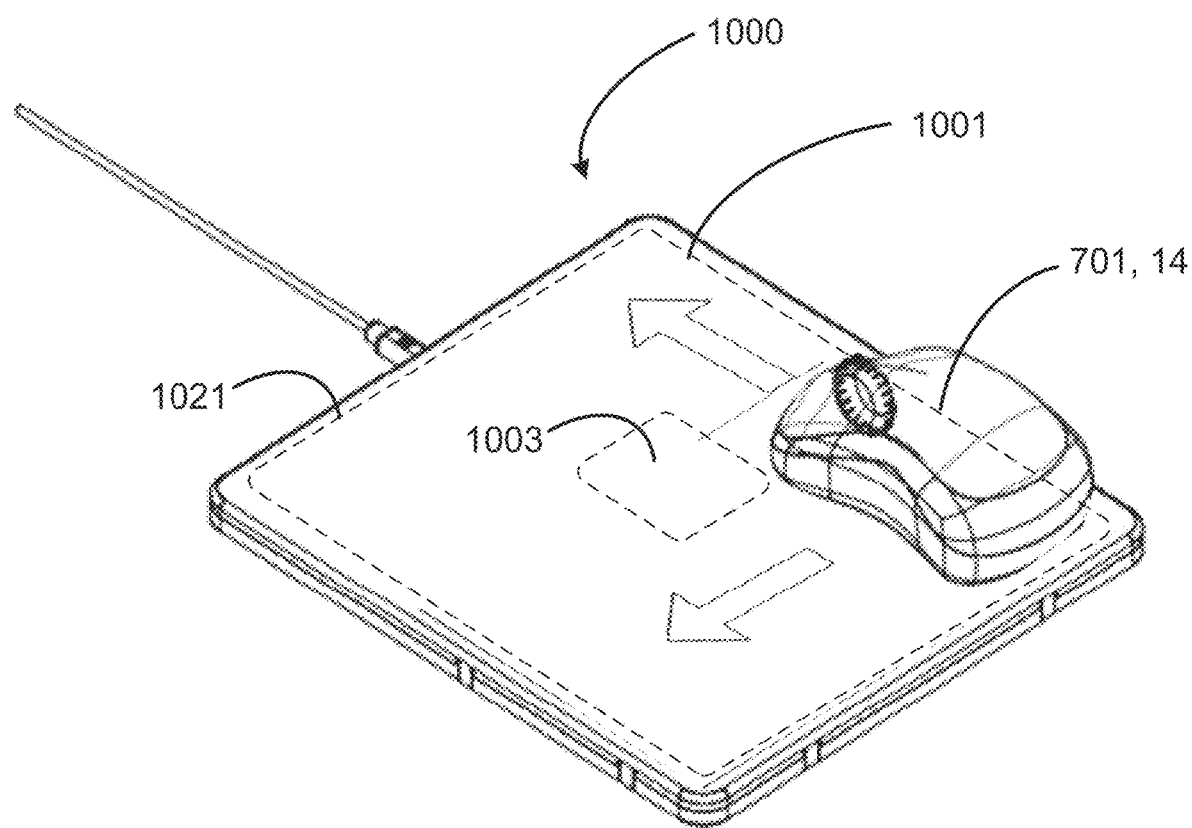
FIG. 8 is a perspective top view of the peripheral device and supporting charging surface in accordance with the present disclosure, showing a location of the peripheral device relative to a charging coil.

FIG. 8 provides an example of a suitable peripheral environment 1000 within which a device in accordance with the disclosure may be used. FIG. 8 is a perspective top view of a wireless power transfer system, wherein a peripheral device 14, having therein a shielded wireless receiver coil 801, 901 such as shown in FIGS. 8-9. The central sensor 705, not seen in this view, faces downward directly at the surface of a mouse pad 1001. The vertical projection 1021 of the antenna 21 associated with the transmitter system 20, 21 within the mouse pad 1001 is shown in dashed outline. A smaller area 1003 of optimal coupling is also shown in dashed outline. The wireless transmission system 20, 21 of the mouse pad 1001 is capable of functioning to power or charge the peripheral device 14 via its wireless receiver system 30, 31.

While illustrated as individual blocks and/or components of the wireless power transmitter 20, one or more of the components of the wireless power transmitter 20 may combined and/or integrated with one another as an integrated circuit (IC), a system-on-a-chip (SoC), among other contemplated integrated components. Further, any operations, components, and/or functions discussed with respect to the power transmitter 20 and/or components thereof may be functionally embodied by hardware, software, and/or firmware of the power transmitter 20.

Similarly, while illustrated as individual blocks and/or components of the power receiver 30, one or more of the components of the power receiver 30 may combined and/or integrated with one another as an IC, a SoC, among other contemplated integrated components. To that end, one or more of the components of the power receiver 30 and/or any combinations thereof may be combined as integrated components for one or more of the power receiver 30 and/or components thereof. Further, any operations, components, and/or functions discussed with respect to the power receiver 30 and/or components thereof may be functionally embodied by hardware, software, and/or firmware of the power receiver 30.

The systems, methods, and apparatus disclosed herein are designed to operate in an efficient, stable and reliable manner to satisfy a variety of operating and environmental conditions. The systems, methods, and/or apparatus disclosed herein are designed to operate over a wide range of thermal and mechanical stress environments so that data and/or electrical energy is transmitted efficiently and with minimal loss. In addition, the system 10 may be designed with a small form factor using a fabrication technology that allows for scalability, and at a cost that is amenable to developers and adopters. In addition, the systems, methods, and apparatus disclosed herein may be designed to operate over a wide range of frequencies to meet the requirements of a wide range of applications.

In an embodiment, a ferrite shield may be incorporated within the antenna structure to improve antenna performance. Selection of the ferrite shield material may be dependent on the operating frequency as the complex magnetic permeability ($\mu=\mu'-j*\mu^-$) is frequency dependent. The material may be a polymer, a sintered flexible ferrite sheet, a rigid shield, or a hybrid shield, wherein the hybrid shield comprises a rigid portion and a flexible portion. Additionally, the magnetic shield may be composed of varying material compositions. Examples of materials may include, but are not limited to, zinc comprising ferrite materials such as manganese-zinc, nickel-zinc, copper-zinc, magnesium-zinc, and combinations thereof.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more embodiments, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub combination or variation of a sub combination.

What is claimed is:

1. A wireless power transfer system for a peripheral device, the wireless power transfer system comprising:
   a wireless receiver system within the peripheral device, the wireless receiver system comprising:
   a receiver antenna configured to receive wireless power signals and wireless data signals via inductive coupling with a transmission antenna, the receiver antenna defining a first central opening;
   a shield adjacent to the receiver antenna, the shield defining a second central opening, and wherein a portion of the shield extends into the first central opening; and
   a sensor located centrally to both the first and second central openings, wherein a portion of the sensor is positioned above the portion of the shield that extends into the first central opening, and wherein the sensor is configured to sense a position of the peripheral device.

2. The wireless power transfer system of claim 1, wherein the sensor is an optical sensor.

3. The wireless power transfer system of claim 1, wherein the first central opening and the second central opening are of different sizes.

4. The wireless power transfer system of claim 1, wherein the shield comprises a ferrite material.

5. The wireless power transfer system of claim 4, wherein the ferrite material comprises one or more of a polymer, sintered flexible ferrite sheet, rigid shield, or a hybrid shield having a rigid portion and a flexible portion.

6. The wireless power transfer system of claim 5, wherein the ferrite material includes one or more of manganese-zinc, nickel-zinc, copper-zinc, magnesium-zinc, or combinations thereof.

7. A peripheral device comprising:
  a wireless receiver system, the wireless receiver system comprising:
    a receiver antenna configured to receive wireless power signals and wireless data signals from a wireless transmitter system via inductive coupling, the receiver antenna being a substantially flat coil defining a first central opening;
    a shield adjacent to the receiver antenna, the shield defining a second central opening, and wherein a portion of the shield extends into the first central opening; and
    a sensor located centrally to both the first and second central openings, wherein a portion of the sensor is positioned above the portion of the shield that extends into the first central opening, and wherein the sensor is configured to sense a position of the peripheral device.

8. The peripheral device of claim 7, wherein the sensor is an optical sensor.

9. The peripheral device of claim 7, wherein the first central opening and the second central opening are of different sizes.

10. The peripheral device of claim 7, wherein the shield comprises a ferrite material.

11. The peripheral device of claim 10, wherein the ferrite material comprises one or more of a polymer, sintered flexible ferrite sheet, rigid shield, or a hybrid shield having a rigid portion and a flexible portion.

12. The peripheral device of claim 11, wherein the ferrite material includes one or more of manganese-zinc, nickel-zinc, copper-zinc, magnesium-zinc, or combinations thereof.

13. A wireless power transfer system comprising:
  a horizontal surface;
  a horizontal transmitter antenna positioned below the horizontal surface, the horizontal transmitter antenna configured for sending wireless power signals and wireless data signals;
  a peripheral device comprising:
    a receiver antenna configured to receive the wireless power signals and wireless data signals via inductive coupling with the horizontal transmitter antenna, the receiver antenna comprising a substantially flat coil and defining a first central opening, wherein the receiver antenna is positioned substantially parallel to the horizontal transmitter antenna during use;
    a shield adjacent to the receiver antenna, the shield defining a second central opening, and wherein a portion of the shield extends into the first central opening; and
    a sensor located centrally to both the first and second central openings, wherein a portion of the sensor is positioned above the portion of the shield that extends into the first central opening, and wherein the sensor is configured to sense a position of the peripheral device on the horizontal surface.

14. The wireless power transfer system of claim 13, wherein the sensor is an optical sensor.

15. The wireless power transfer system of claim 13, wherein the first central opening and the second central opening are of different sizes.

16. The wireless power transfer system of claim 13, wherein the shield comprises a ferrite material.

17. The wireless power transfer system of claim 16, wherein the ferrite material comprises one or more of a polymer, sintered flexible ferrite sheet, rigid shield, or a hybrid shield having a rigid portion and a flexible portion.

18. The wireless power transfer system of claim 13, wherein the horizontal surface is configured as a top surface of a housing, and wherein the horizontal transmitter antenna extends under a substantial portion of an area of the horizontal surface.

19. The wireless power transfer system of claim 18, wherein the horizontal transmitter antenna is configured to power or charge the peripheral device when the peripheral device is positioned above the horizontal transmitter antenna on the horizontal surface.

20. The wireless power transfer system of claim 19, wherein the peripheral device is configured as one or more of a computer input device, a mouse, or combinations thereof.

* * * * *